April 26, 1932. O. J. SUNDSTRAND 1,856,056
ADDING AND LISTING MACHINE, CASH REGISTER, ETC
Original Filed Aug. 4, 1923 6 Sheets—Sheet 1
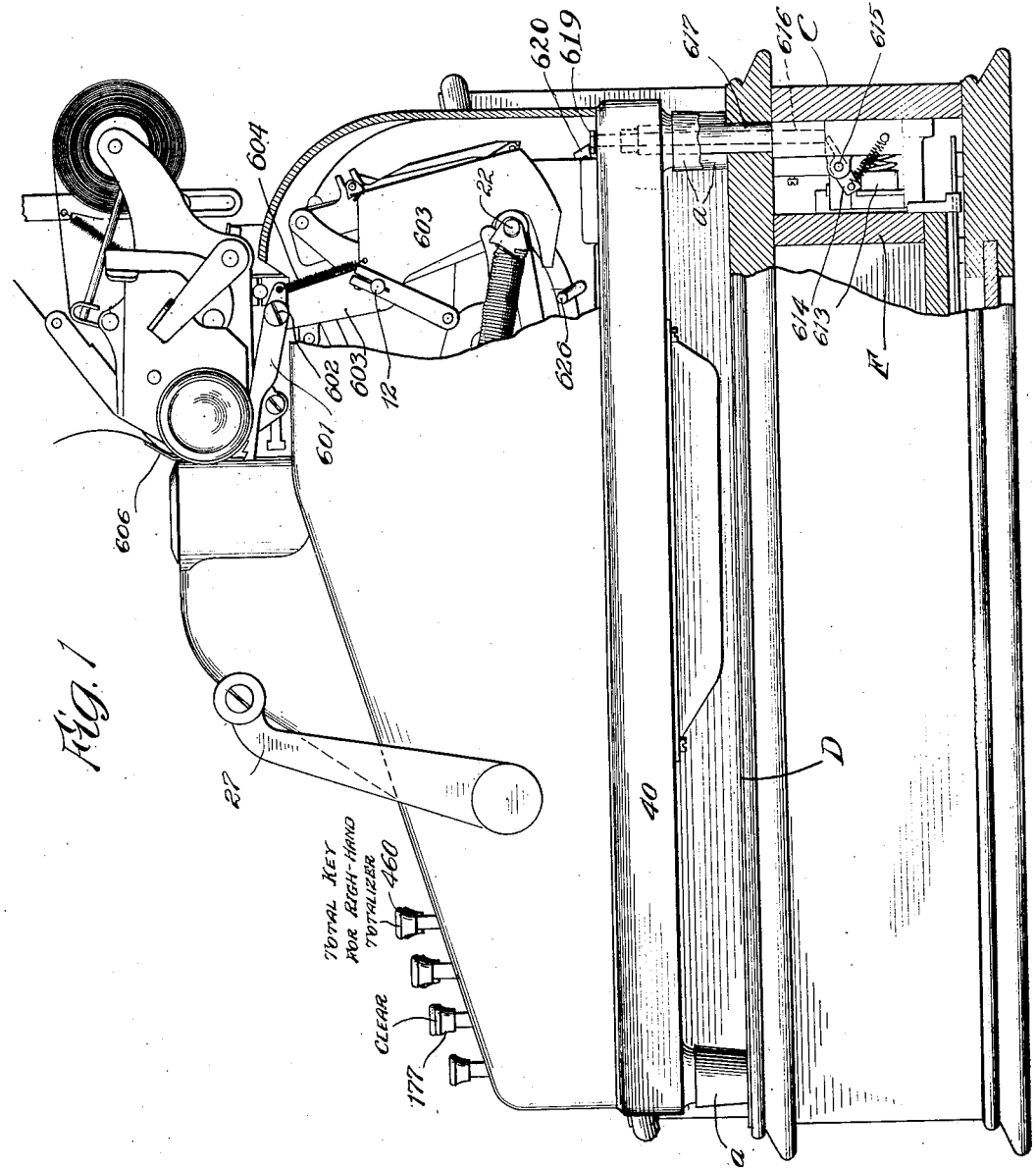

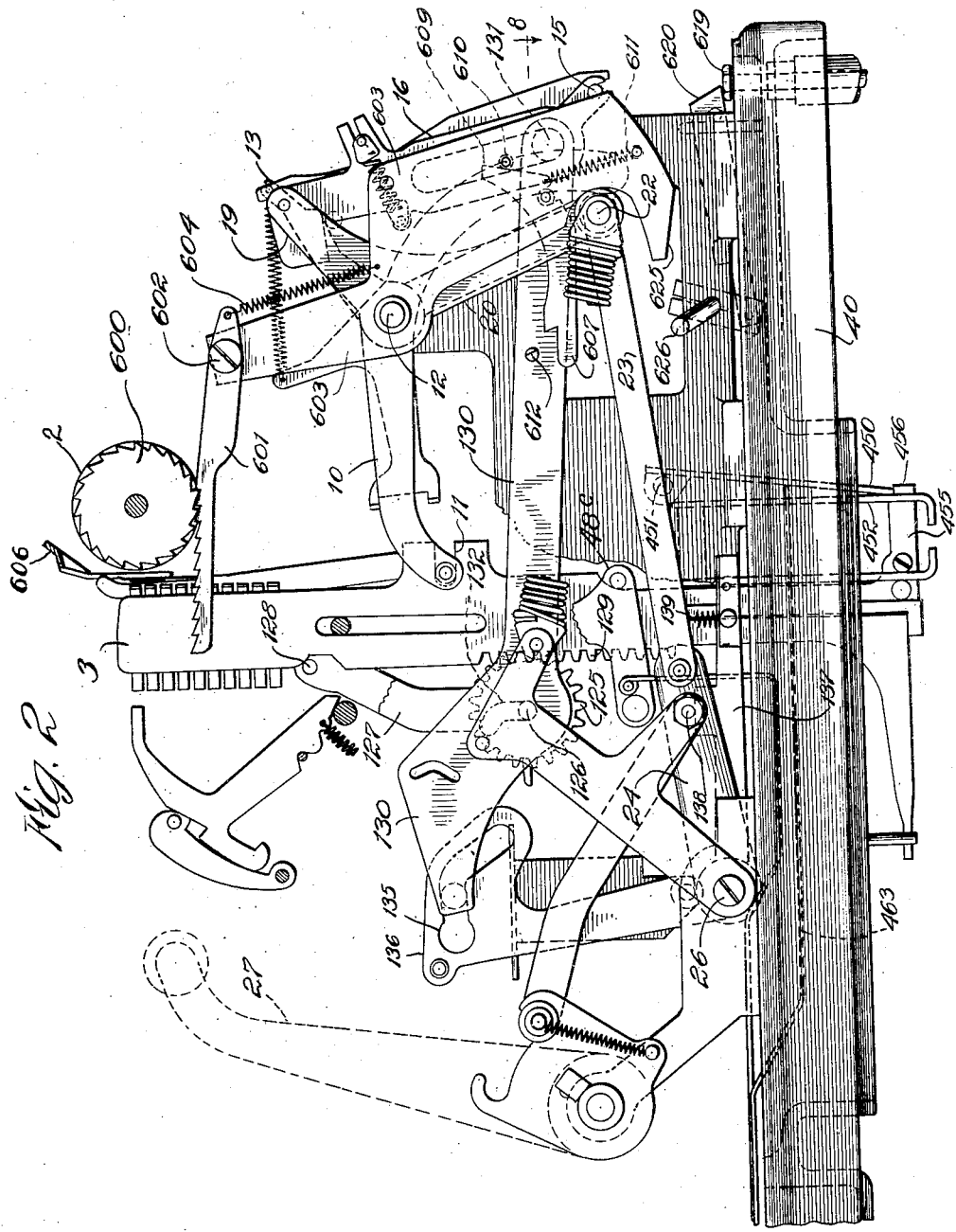

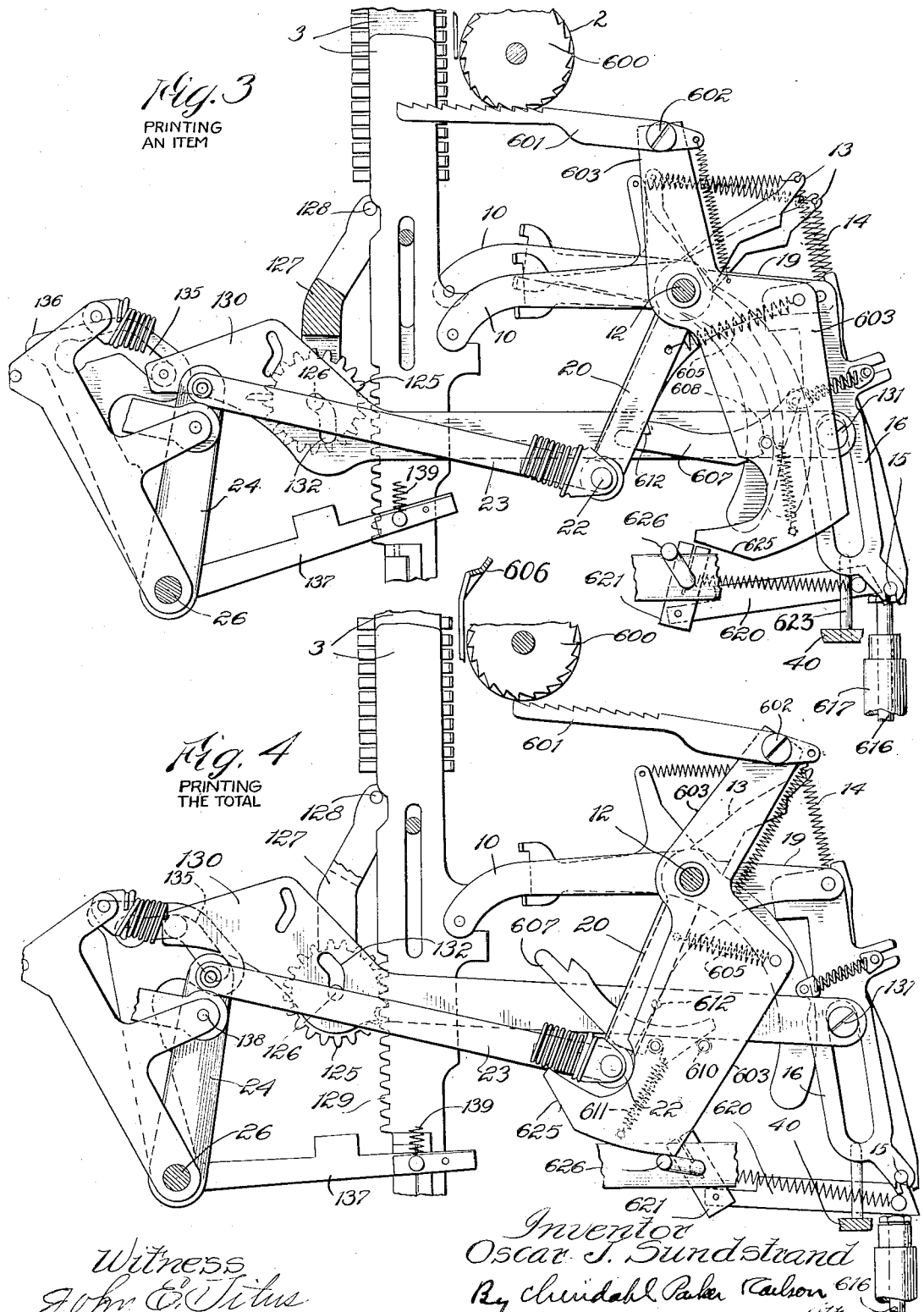

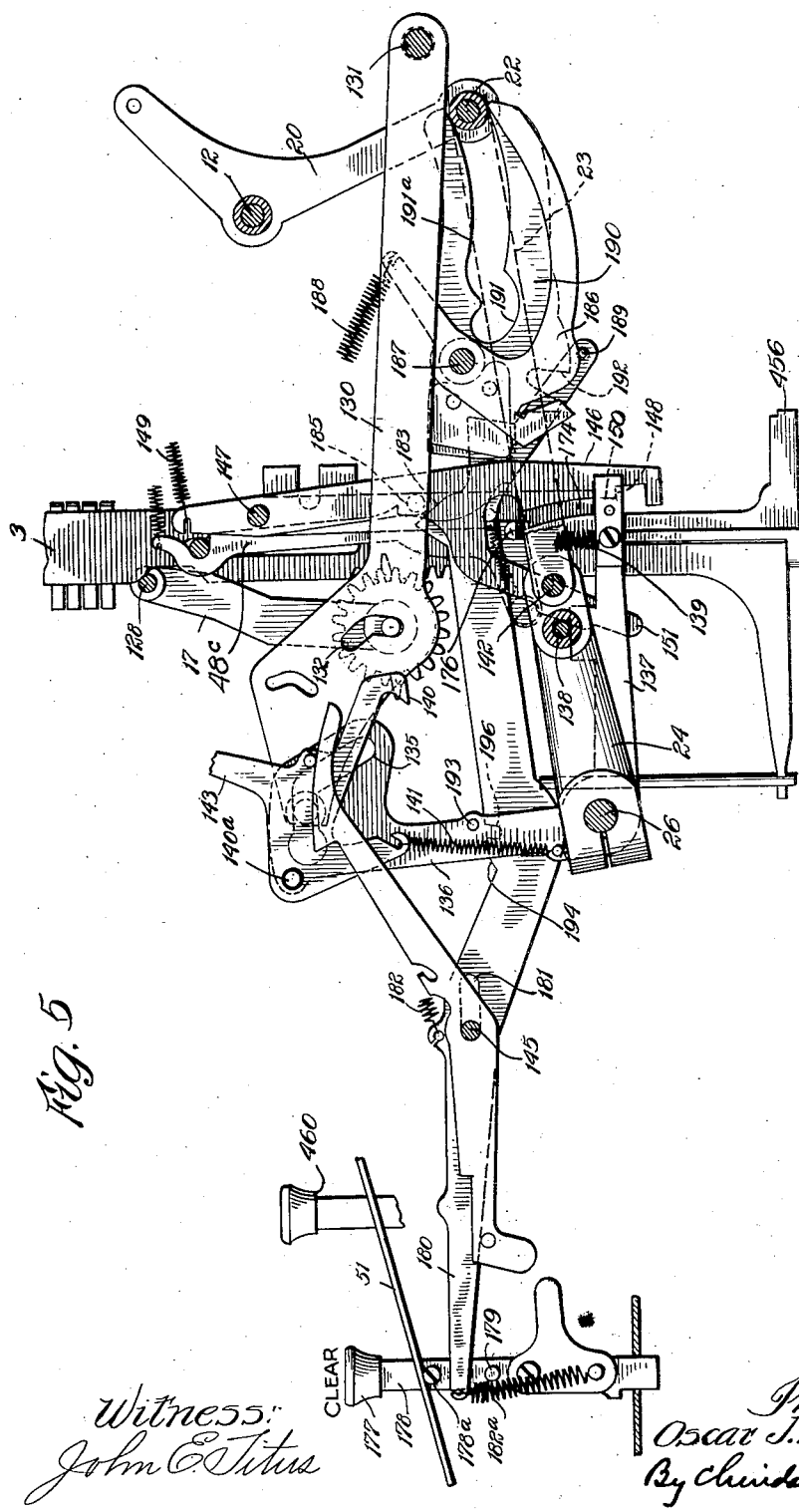

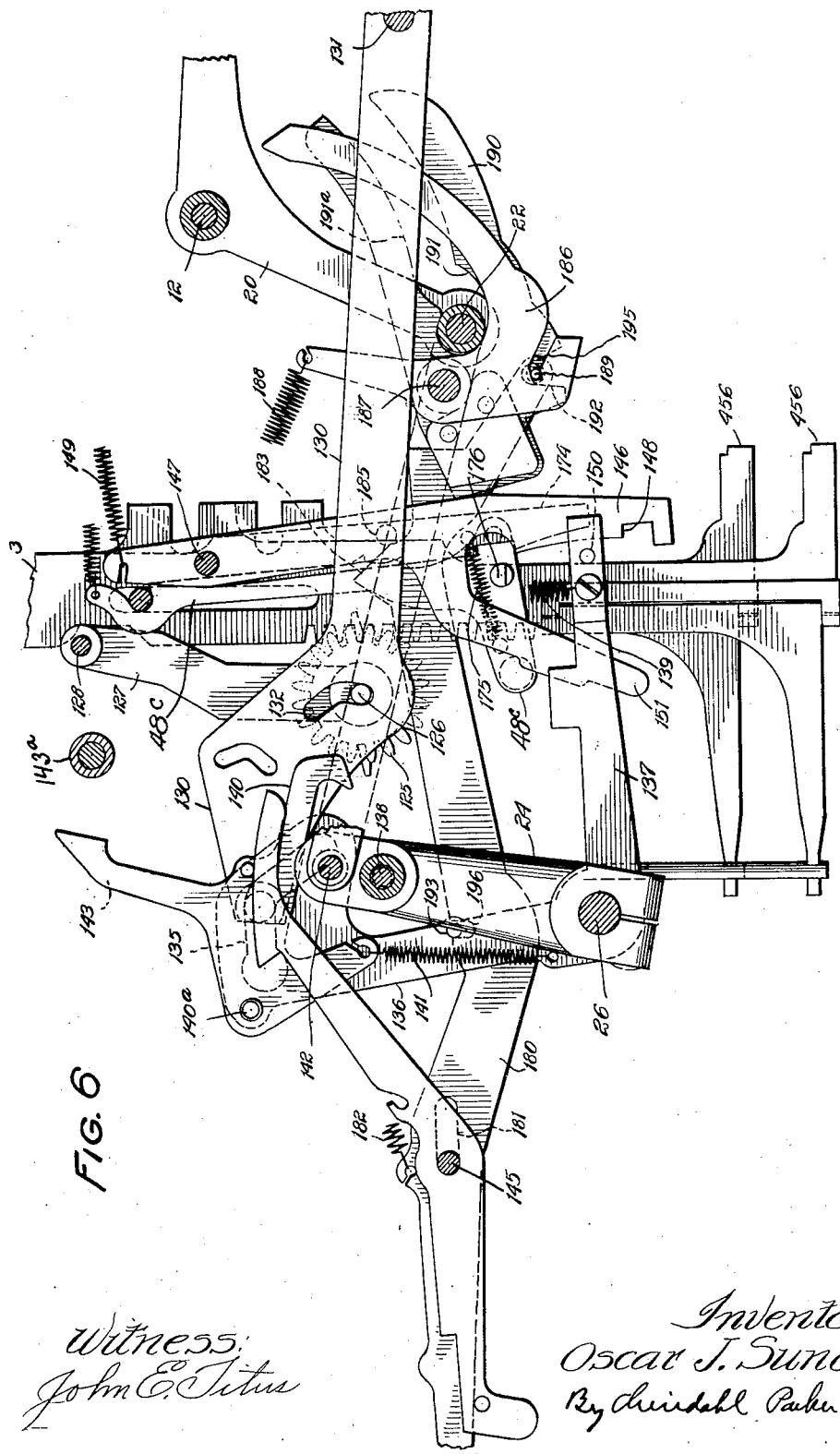

April 26, 1932.  O. J. SUNDSTRAND  1,856,056
ADDING AND LISTING MACHINE, CASH REGISTER, ETC
Original Filed Aug. 4, 1923   6 Sheets-Sheet 6
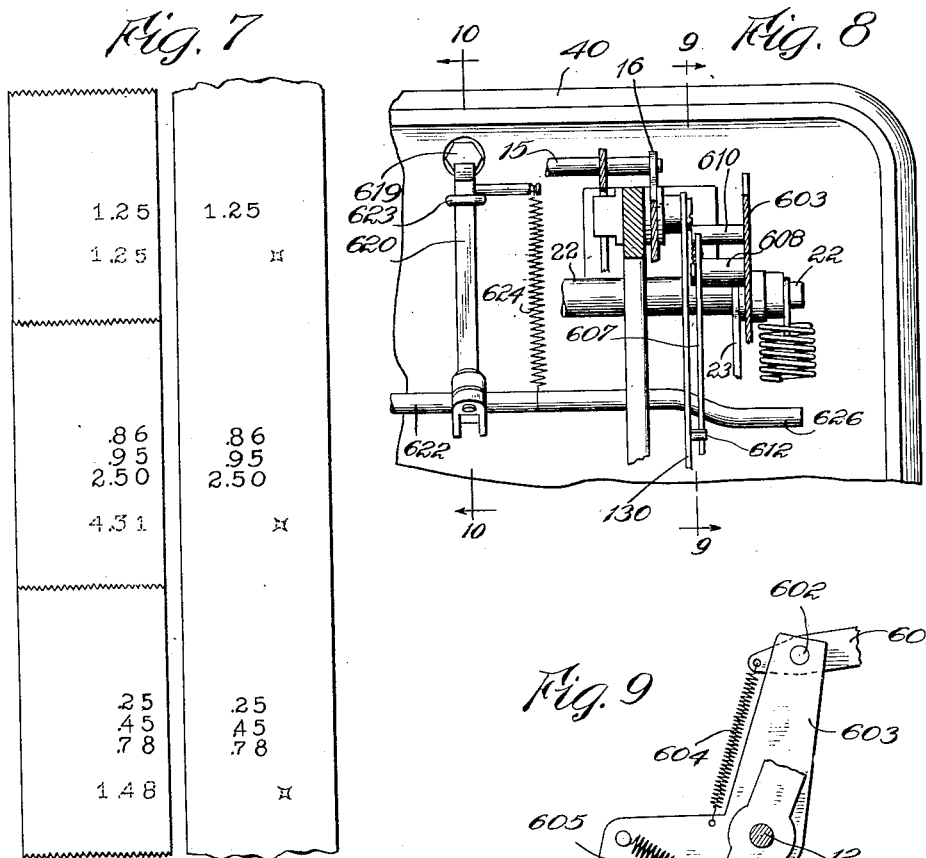
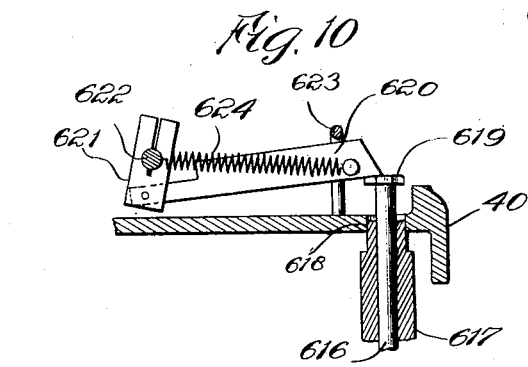
Witness
John E. Titus
Inventor
Oscar J. Sundstrand
By Chindahl Parker Carlson
Attys Patented Apr. 26, 1932

1,856,056

UNITED STATES PATENT OFFICE

OSCAR J. SUNDSTRAND, OF ROCKFORD, ILLINOIS, ASSIGNOR, BY MESNE ASSIGNMENTS, TO SUNDSTRAND CORPORATION, OF WILMINGTON, DELAWARE, A CORPORATION OF DELAWARE

ADDING AND LISTING MACHINE, CASH REGISTER, ETC.

Application filed August 4, 1923, Serial No. 655,558. Renewed November 6, 1929.

Machines embodying the present invention are useful in retail stores where it is desirable to give each customer a slip showing the various items of his purchase, together with a total of the items, and to preserve a record of the items of all sales. The invention has special reference to cash registers of the class in which a self-contained adding and listing machine is removably positioned upon a casing containing a cash drawer, means being provided for unlocking the cash drawer through operation of the adding and listing machine. For the purpose of explaining the manner in which the present invention may be practically applied, I have herein disclosed the invention as embodied in a cash register of the character above outlined, but it should be understood that the invention is not limited to machines of this particular type.

As is well understood, the main handle of an adding machine such as those above referred to is operated once for each item listed or added. It is desirable, however, that the salesman, cashier or other person operating the cash register shall not have access to the contents of the cash drawer until all of the items constituting the purchase have been registered. It is one of the objects of the present invention to provide means whereby the cash drawer shall remain locked until all of the items of a purchase have been registered, and whereby the drawer shall be automatically opened during or about the time of printing the total.

Adding and listing machines are usually provided with a tearing plate against which the portion of the tape containing the list of items may be torn off. The upper or tearing edge of this plate is generally located some little distance above the printing line and consequently it has been necessary to turn the platen by hand in order to bring the last item or the total above the tearing plate.

One object of the present invention is to provide in an adding and recording machine having a rotary platen, means for automatically turning the platen sufficiently to bring the total above the tearing plate, the line-space mechanism being actuated in the normal manner after the printing of each item.

Another object of the invention is to provide means for automatically printing the grand or final total upon the completion of a listing operation.

A further object is to provide, in a duplex adding and listing machine, means for automatically clearing one of the totalizers while retaining the amount accumulated in the other totalizer.

In the accompanying drawings, Figure 1 is a side elevation of one form of cash register embodying the features of this invention, portions being broken away to illustrate some of the interior mechanism. Fig. 2 is a fragmental side elevation of the adding and listing machine showing the parts in the position of rest. Fig. 3 is a view showing the parts in the position assumed when an item is being printed. Fig. 4 represents the parts in the position occupied when the total is being printed. Fig. 5 illustrates the total-taking mechanism, the machine being in the initial position or position of rest. Fig. 6 shows the parts in the position assumed when the handle is pulled to its extreme forward position. Fig. 7 illustrates a specimen of the work done by the machine. Fig. 8 is a view taken approximately in the plane of dotted line 8 of Fig. 2. Fig. 9 is a fragmental view taken in the plane of line 9—9 of Fig. 8. Fig. 10 is a view taken in the plane of line 10—10 of Fig. 8.

For convenience in imparting an understanding of the invention, the same will be herein described in connection with a ten-key adding and listing machine substantially similar to the one shown in Patent No. 1,198,487 issued September 19, 1916, to Rockford Milling Machine Company upon an application filed by Gustaf D. Sundstrand, but it should be clearly understood that the present invention is not limited to machines of the general character disclosed in said patent.

The machine herein shown comprises various features described and claimed in my copending application, Serial No. 492,242, filed August 15, 1921 (now Patent No. 1,694,-

803, dated December 11, 1928), in that it comprises a rotatable platen 2, means for guiding two tapes side by side (i. e., abreast) to the platen, and two sets of vertically-reciprocable type-bars 3, the left-hand set being adapted to print the items and the total of each sale, and the right-hand set being adapted to print the items of each sale and the total amount of all sales. The machine further comprises a left-hand totalizer operatively related to the left-hand group of type-bars for adding the items of each sale, and a right-hand totalizer operatively associated with the right-hand set of type-bars for adding all items introduced into the machine. Means is provided in conjunction with the left-hand totalizer for automatically obtaining final totals. In connection with the right-hand totalizer, there is a total key 460 for obtaining totals.

The means for vertically moving each type bar into and out of printing position may be of any desired character, that herein shown being substantially similar to the construction fully disclosed in Patent No. 1,198,487. Inasmuch as reference may be made to that patent for a complete illustration and description of the type bar moving means, it will be sufficient to say that said means comprises an arm 10 carrying a roller that lies in a notch 11 in the type bar. The arm 10 is pivotally mounted on a fixed shaft 12. Rigid with the arm 10 is an arm 13 which is yieldingly connected through a coiled spring 14 to a rod 15. The latter is carried by two side members 16 which are guided for approximately vertical movement. Pivoted to the upper end of each side member 16 is an arm 19 which is pivotally mounted on the shaft 12. Rigid with each arm 19 is an arm 20. The arms 20 (one at each side of the machine) carry a rod 22. The end portions of the rod 22 are connected through links 23 to two crank arms 24 fixed on the main rock shaft 26. The shaft 26 is arranged in any suitable manner to be rocked by means of a handle or crank 27.

When the operator pulls the handle 27 forward, the shaft 26 is caused to rock in the direction to swing the crank arms 24 upwardly, thereby drawing the rod 22 forward and moving the side members 16 and the rod 15 downward. The movement of the rod 15 is yieldingly transmitted through the springs 14 and the arms 13 and 10 to such of the type bars 3 as are at liberty to rise. When the operator releases the handle upon the completion of the forward stroke, the handle is automatically returned to its normal position (shown in dotted lines in Fig. 2) and the bars 3 drawn down as fully described in said Sundstrand patent.

While the calculating mechanism may be of various forms, it is herein shown as comprising a series of adding pinions 125 rotatably mounted upon a shaft 126 which, in the present embodiment, is carried by a frame 127 pivoted at 128. The pinions 125 (of which there is one for each type bar 3) are adapted to mesh with rack teeth 129 formed in said type bars. When an item is to be added, the frame 127 is swung forward to disengage the pinions 125 from the racks 129 before the type bars 3 are raised, and said frame is swung rearwardly just before the type bars are moved downwardly. Addition therefore occurs in the downward stroke of the type bars. The frame 127 may be swung to carry the pinions into and out of mesh with the racks 129 by any suitable means, as, for example, a lever 130 pivoted to the framework of the machine at 131. In the lever 130 is a cam slot 132 in which lies an anti-friction roller on the end of the adding pinion shaft 126. On the free end of the lever 130 is a roller stud that lies in a cam slot 135 in a lever 136. The lever 136 is pivotally mounted on the rock shaft 26, and has an arm 137 which is arranged to be engaged by a pin 138 on the adjacent arm 24. A spring 139 tends to move the lever 136 in the direction to move the pinions out of mesh with the racks. When the operator begins to pull the handle 27 forward, the pin 138 leaves the arm 137 and thus allows the spring 139 to throw the pinions out of mesh with the racks. When the handle begins to return to normal position, the pinions must be placed in mesh with the racks, which result is effected by the following described means: a hook 140 (Fig. 5) is pivoted to the lever 136 at 140$^a$ and is acted upon by a tension spring 141. Said hook is adapted to yield to allow a stud 142 on the crank arm 24 to pass on the front stroke of the handle, said hook springing into engagement with the stud as the handle completes its forward stroke. On the back stroke of the handle, the hook 140 causes the lever 136 to move with the crank arm 24, thus throwing the pinions into mesh. At the proper point in the back stroke of the crank arm 24, the lever 136 is released therefrom through the rising of the hook 140 due to contact of the finger 143 (Fig. 6) of said hook with a stationary part 143$^a$. When the hook 140 is thus disengaged from the stud 142, the lever 136 is prevented from swinging forward under the influence of the spring 139 by a latch 146 pivoted at 147, said latch having a locking shoulder 148. A spring 149 tends to hold the latch 146 against a pin 150 on the arm 137. On the latch 146 is a finger 151 adapted to be engaged by the pin 138 on the crank arm 24, as shown in Fig. 5. In the back stroke of the crank arm 24, the pin 150 passes under the locking shoulder 148 just before the hook 140 is disengaged from the arm 24. As the arm 24 finishes its back stroke, the pin 138 thereon engages the finger 151 and pushes the latch out of engagement with the pin 150, the pin 138 then serving to hold the arm 137 down.

It will be seen that when an item is to be added and printed, the spring 139 throws the pinions out of mesh with the racks before the latter begin their upward movement, and that the stud 142, acting through the hook 140, throws the pinions into mesh with the racks just before the racks commence to descend.

When a total is to be printed, the pinions are retained in mesh with the racks during the upward movement of the type bars 3, the extent of the upward movement of said bars being determined as explained in said Sundstrand Patent No. 1,198, 487. To retain the pinions in mesh with the racks when the handle 27 is pulled forward, I provide a latch 174 (Figs. 5 and 6) pivoted at 147, the lower end of said latch being adapted to overlie the pin 150 and thus hold down the arm 137 when the handle 27 and the crank arm 24 make their forward stroke. A spring 175 (Fig. 6) tends to hold the latch 174 in operative position and against a pin 176 on the swinging frame 48$^c$. (For a description of the construction and functions of the frame 48$^c$, reference may be made to Patents Nos. 1,198,487 and 1,583,102). When no item is set up on the keyboard (as is the case when the total is to be printed) the swinging frame 48$^c$ is in its forward position, and the latch 174 is therefore in position to hold the pinions in mesh with the racks.

To clear the machine, the pinions are withdrawn from the racks before the latter descend, thus leaving all of the pinions standing at zero. This is accomplished by withdrawing the latch 174 from the pin 150 just before the racks descend. Said latch is withdrawn by means comprising a clear key 177 (Fig. 5) having a stem 178. In the present embodiment of the invention the clear key 177 is permanently held depressed by suitable means, as, for example, a stud 178$^a$ on the stem 178 lying in contact with the lower side of the keyboard plate 51. On the stem 178 is a stud 179 that underlies the forward end of a lever 180. The lever 180 has an enlongated opening 181 through which the pivot rod 145 extends, the lever 180 thus being movable longitudinally to a slight extent. A spring 182 tends to slide the lever 180 rearwardly. 182$^a$ is a contractile spring stretched between the stem 178 and the front end of the lever 180 and tending to pull said lever down against the stud 179. On the rear portion of the lever 180 is a bevelled shoulder or cam surface 183 adapted to engage a stud 185 on the latch 174, and thus swing the latch rearwardly out of engagement with the pin 150 when the rear end of the lever 180 is swung upwardly by the spring 182$^a$. During the printing of an item and during the enforced blank or spacing stroke prior to the taking of a total, the lever 180 is held against movement by the spring 182$^a$ by means comprising a cam plate 186 which is pivoted at 187 and is acted upon by a contractile spring 188. On the rear end of the lever 180 is a pin 189 underlying the cam plate 186. The spring 188 normally holds the cam plate 186 in contact with a roller on the rod 22. A detent plate 190 pivoted on the center 187 has a cam slot 191 having a dwell portion 191$^a$ in which the roller on the rod 22 is arranged to run. That portion of the pin 189 which projects from the inner side of the lever 180 underlies the edge of the plate 190. In the lower edge of the plate 190 is a notch 192.

As will be remember, the rod 22 is connected to swing back and forth with the handle 27. When the handle is drawn forward to print an item, or in taking a blank stroke, the lever 180 is held against movement by the spring 182$^a$, first by the cam plate 186 overlying the pin 189, and later by a pin 193 (Fig. 5) on the lever 136 overlying the portion 194 of the lever 180. When the handle 27 is drawn forward to take a total, the levers 136 and 137 are held by the latch 174; and consequently when the plate 190 has swung far enough to bring the notch 192 into register with the pin 189 the spring 182$^a$ raises the rear end of the lever 180, the pin 189 entering the notch 192, and the cam plate 186 moving into the position shown in Fig. 6 as soon as the pin 189 has risen into register with a locking slot 195 in the cam plate 186. In the lever 180 is a notch 196 which receives the pin 193 when the rear end of said lever rises as just described. As the rear end of the lever 180 rises, the shoulder 183 acting upon the stud 185 pushes the latch 174 rearwardly out of engagement with the pin 150 on the lever 137, the adding pinions being still retained in mesh with the racks because the pin 193 lies within the notch 196, the stud 189 lies in the notch 192 of the locking plate 190, and said plate is controlled by the rod 22. Very shortly after the handle 27 has commenced its return stroke, the rod 22, acting on the walls of the cam slot 191, swings the plate 190 downwardly, thus pushing the lever 180 forwardly, and thereby positively swinging the lever 136 forward, and throwing the pinions out of mesh with the racks, leaving the pinions standing at zero. As the rod 22 makes its return stroke, it swings the plate 186 against the tension of the spring 188, the lower edge of said plate positively camming the stud 189 down, and thus restoring the lever 180 to its initial or inoperative position.

When the total accumulated in the right hand totalizer is to be printed and said totalizer cleared, the operator depresses a total key 460 arranged to operate a mechanism which may be similar, for example, to that shown in my Patent No. 1,694,803. The mechanism disclosed in that patent includes a detent plate 450 (Fig. 2) by means of which those type bars of the right-hand group which are not required in recording a given item are prevented from rising when the handle 27 is pulled forward. Said detent plate 450 is slidably mounted upon a transverse guide rod 451. The lower edge of the plate 450 lies in contact with a slotted guide plate 452 forming part of the structure that guides the type bars during their vertical movement. Each type bar has a rearwardly extending portion 455 slidably engaging one of the slots in the plate 452. The portions 455 of the type bars associated with the right hand totalizer extend rearwardly of the plate 452 so as to constitute projections 456 which normally lie beneath the lower edge of the plate 450. The means for swinging the plate 450 rearwardly out of engagement with the projections 456 when the total accumulated in the right-hand totalizer is to be printed consists of a wire or rod 463 arranged to be moved lengthwise by means of the total key 460.

The means for rotating the platen step by step comprises a ratchet wheel 600 fixed to the platen and arranged to be engaged by ratchet teeth upon a bar or lever 601. The lever 601 is pivoted at 602 to the upper arm of a lever 603 which is pivotally mounted upon the shaft 12. A coiled contractile spring 604 anchored at one end to the lever 603 and at its other end to an arm of the lever 601, holds the lever 601 in contact with the ratchet wheel 600. The lower arm of the lever 603 is normally held against a collar on the rod 22 by means of a coiled contractile spring 605 (Figs. 3 and 9) which is attached at one end to the lever 603 and at its other end to the adjacent arm 20. It will be seen that when the handle 27 is pulled forward in the operation of printing an item or a total, the lower arm of the lever 603 will follow the rod 22 as the latter moves forwardly, thereby drawing the ratchet bar 601 rearwardly; and that when the handle is released, the rod 22 in returning to its normal position will push the lower arm of the lever 603 to the position shown in Fig. 2, thereby causing the platen to be turned. When an item is to be printed, the lower arm of the lever 603 is allowed to follow the rod 22 in its forward movement only far enough to provide a normal linespace movement of the platen in the return movement of the rod 22. When, however, a total is to be printed, the lower arm of the lever 603 is permitted to follow the rod 22 farther in its forward movement, whereby the platen is rotated through a longer arc in the return movement of the rod 22, the arc of movement of the platen being sufficiently great to bring the total above the upper edge of the tearing plate 606. The means for controlling the extent of movement of the lever 603 comprises a latch 607 (Fig. 3) pivoted on the lower arm of the lever 603 at 608. The rear end 609 (Fig. 9) of the latch 607 is normally held against a stop pin 610 on the lever 603 by a coiled contractile spring 611. On the lever 130 is a stud 612. When the lever 130 is swung downwardly preparatory to the printing of an item, the stud 612 is brought within the path of the latch 607 so that when the rod 22 moves forwardly said latch engages the stud 612 and prevents forward movement of the lower arm of the lever 603 beyond what is necessary to produce a linespace movement of the platen. When a total is to be printed, however, the lever 130 remains in its upper position while the rod 22 is moving forwardly, hence the stud 612 is out of the path of movement of the latch 607, the lower arm of the lever 603 being therefore free to follow the rod 22 in the forward movement of the latter. As a consequence, the platen is rotated through a correspondingly long arc of movement, thereby bringing the total above the upper edge of the tearing plate.

The casing or cabinet which contains the cash drawer may be of any preferred construction. Herein is shown a casing C (Fig. 1), the upper surface of which constitutes a table or platform D upon which the adding and listing machine may be set. It may be here noted that the machine has a base 40 supported upon rubber feet a which stand upon the platform D. E is the cash drawer.

The means for locking the drawer E in the closed position may be of any desired character, and hence has not been illustrated in detail herein. Reference may be made to application Serial No. 492,243, filed by me on August 15, 1921, (which has since matured into Patent No. 1,568,300, dated January 5, 1926) for a disclosure of one form of lock which may be employed. It is sufficient here to state that 613 is a spring-actuated lever which tends to open the drawer, said lever being located in the rear portion of the casing C and being normally restrained by means of a latch 614 which is pivoted at 615. The latch 614 is arranged to be tilted to free it from engagement with the lever 613 by means of a plunger 616 which is vertically reciprocable in a guide 617, the lower end of the plunger being arranged to engage one arm of the latch. The guide 617 is secured to the rear end of the casing C. The guide 617 projects upwardly from the platform D, its upper portion passing through an opening 618 (Fig. 10) formed in the base 40 of the adding and listing machine. Thus the guide 617 serves to locate the adding and listing machine upon the cabinet C in operative relation to the cash drawer. On the upper end of the plunger 616 is a head 619. The plunger 616 is arranged to be depressed by power derived from the rod 15, but in order that the plunger shall not be depressed in every cycle of operations of the machine, I provide a member which is arranged to be interposed between the rod 15 and the plunger 616 whenever a total is being taken, said rod depressing said member and the plunger 616, and thus causing the cash drawer to be unlocked. The member referred to consists, in the present embodiment, of a block 620 pivoted at its forward end to an arm 621 fixed upon a rock shaft 622 (Figs. 8 and 10). The rear end of the block 620 rests at all times upon the head 619 of the plunger 616. A fixed guide loop 623 prevents lateral displacement of the block 620. A coiled contractile spring 624 normally holds the block 620 forward far enough to be out of the path of the rod 15 (see Fig. 3). On the lower end of the lever 603 is a cam surface 625 arranged to engage a crank arm 626 on one end of the shaft 622. It will be evident that when the adding machine is being operated to print a total, the cam 625 will cause the lever 620 to be projected rearwardly into the path of the rod 15 (as shown in Fig. 4), whereby the plunger will be depressed and the cash drawer unlocked.

It will be evident that the cash drawer cannot be unlocked until all the items making up a given sale have been recorded.

The clear key 177 being locked in its depressed or operated position, a total of the items of each sale and a clearing operation of the left-hand totalizer are automatically obtained.

It will be seen that whenever a total is printed, the paper is automatically fed far enough to bring the total above the tearing plate. This feature obviously is applicable to machines having a single totalizer.

As will be readily understood, the adding and listing machine may be lifted off the casing C and taken to any place where it may be desired to make computations, etc.

I desire the following claims to be construed as broadly as the prior state of the art permits. Where the handle is referred to it will be understood to include any equivalent means, such as a motor.

I claim as my invention:

1. A machine of the character described having, in combination, a rotary platen, a lever and connections for turning the platen, adding mechanism including a group of adding wheels, a member movable whenever the machine is actuated to print an item or a total, a spring connecting said lever to said member, a latch pivoted to said lever, and a lever for positioning the adding wheels for addition or totalizing, said second-mentioned lever having a projection arranged to lie in the path of said latch in the addition position of said last-mentioned lever.

2. A machine of the character described having, in combination, a rotary platen, a lever and connections for turning the platen, a member movable whenever the machine is actuated to print an item or a total, a spring connecting said lever to said member, a latch pivoted to said lever, and a lever having a projection arranged to lie in the path of said latch in one position of said last mentioned lever.

3. A machine of the character described having, in combination, a rotary platen, a lever and connections for turning the platen, a member movable whenever the machine is actuated to print an item or a total, a spring connecting said lever to said member, adding wheels, and a lever for positioning the adding wheels for addition or totalizing, the last-mentioned lever being arranged to obstruct the movement of the first-mentioned lever when an item is to be printed.

4. A machine of the character described having, in combination, a rotary platen, a lever and connections for turning the platen, a member movable whenever the machine is actuated to print an item or a total, a spring connecting said lever to said member, and means for obstructing the movement of said lever when an item is to be printed.

5. A machine of the character described having, in combination, a rotary platen, a toothed wheel for turning the platen, a toothed bar engaging said wheel, a lever to which said bar is connected, adding mechanism including a group of adding wheels, a member movable whenever the machine is actuated to print an item or a total, a spring connecting said lever to said member, a latch pivoted to said lever, and a lever for positioning the adding wheels for addition or totalizing, the last-mentioned lever having a projection which in the addition position of the last-mentioned lever lies in the path of said latch and thus limits the movement of the first-mentioned lever and the toothed bar.

6. The combination of a rotary platen, a ratchet wheel connected to said platen, a ratchet bar engaging said wheel, a lever pivoted between its ends, said bar being pivoted to one arm of said lever, means operating on the other arm of said lever for yieldingly swinging said lever in one direction and for positively swinging it in the other direction, and means to limit the extent of movement of the lever in the first-mentioned direction.

7. An adding machine having, in combination, adding mechanism, printing mechanism including a rotary platen for feeding the paper on which the items and totals are printed, mechanism to rotate the platen, a prime mover for actuating all of said mechanisms, a plate in front of the platen, total taking means, and mechanisms actuated in the taking of a total for turning the platen to place the total imprint above the upper edge of said plate.

8. An adding machine having, in combination, adding mechanism, printing mechanism including a rotary paper-supporting platen, a plate above the platen, means to operate the adding mechanism to print the total, and means controlled by the last-mentioned means to turn the platen to place the total imprint above the upper edge of said plate.

9. An adding machine having, in combination, adding mechanism, printing mechanism including a rotary paper-supporting platen, a plate above the platen, a toothed wheel secured to the end of the platen, a bar having a series of teeth engaging said wheel, and mechanism actuated in the taking of a total for operating said bar to turn the platen to place the total imprint above the upper edge of said plate.

In testimony whereof, I have hereunto affixed my signature.

OSCAR J. SUNDSTRAND.